United States Patent
Chauvin et al.

(10) Patent No.: US 9,541,065 B2
(45) Date of Patent: Jan. 10, 2017

(54) WIND TURBINE CONTROL METHOD USING AN ESTIMATION OF THE INCIDENT WIND SPEED

(71) Applicant: IFP Energies nouvelles, Rueil-Malmaison (FR)

(72) Inventors: Jonathan Chauvin, Paris (FR); Ghizlane Hafidi-Rami Yahyaoui, Puteaux (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 14 days.

(21) Appl. No.: 14/432,223

(22) PCT Filed: Sep. 4, 2013

(86) PCT No.: PCT/FR2013/052040
§ 371 (c)(1),
(2) Date: Mar. 30, 2015

(87) PCT Pub. No.: WO2014/053718
PCT Pub. Date: Apr. 10, 2014

(65) Prior Publication Data
US 2015/0285222 A1    Oct. 8, 2015

(30) Foreign Application Priority Data

Oct. 1, 2012 (FR) .................... 12 02601

(51) Int. Cl.
*F03D 7/04* (2006.01)
*F03D 9/00* (2016.01)
*F03D 7/02* (2006.01)

(52) U.S. Cl.
CPC ............ *F03D 7/042* (2013.01); *F03D 7/0224* (2013.01); *F03D 7/045* (2013.01); *F03D 9/002* (2013.01);
(Continued)

(58) Field of Classification Search
CPC .......... F03D 7/042; F03D 17/00; F03D 9/002; F03D 7/0224; F03D 7/045; Y02E 10/722; Y02E 10/723; F05B 2260/821; F05B 2270/32; F05B 2270/20; F05B 2270/1033
See application file for complete search history.

(56) References Cited

U.S. PATENT DOCUMENTS 4,193,005 A  *  3/1980  Kos .................. F03D 7/0224
                                                        290/44
5,155,375 A  *  10/1992  Holley ............... F03D 7/0224
                                                        290/44

(Continued)

FOREIGN PATENT DOCUMENTS

WO    2007010322 A1    1/2007
WO    2012025121 A2    3/2012

OTHER PUBLICATIONS

International Search Report for International Application No. PCT/FR2013/052040 dated Nov. 11, 2013.

*Primary Examiner* — Ramesh Patel
(74) *Attorney, Agent, or Firm* — Firch, Even, Tabin & Flannery LLP

(57) ABSTRACT

The invention is a method for controlling a wind turbine to optimize the energy production with an estimation of the incident wind speed $V_w$ being used to obtain an optimum control (COM). The estimation of wind speed M is achieved by accounting for the dynamics of the system from the measurement of rotor speed the torque imposed on the generator and of orientation of the turbine blades.

26 Claims, 2 Drawing Sheets

(52) U.S. Cl.
CPC ......... *F03D 17/00* (2016.05); *F05B 2260/821* (2013.01); *F05B 2270/1033* (2013.01); *F05B 2270/20* (2013.01); *F05B 2270/32* (2013.01); *Y02E 10/722* (2013.01); *Y02E 10/723* (2013.01)

(56) References Cited

U.S. PATENT DOCUMENTS

| | | | |
|---|---|---|---|
| 5,289,041 A * | 2/1994 | Holley | F03D 7/0224 290/44 |
| 6,137,187 A * | 10/2000 | Mikhail | F03D 7/0224 290/44 |
| 7,939,961 B1 * | 5/2011 | Bonnet | F03D 1/0608 290/44 |
| 2009/0174187 A1 * | 7/2009 | Nyborg | F03D 7/0224 290/44 |
| 2009/0212565 A1 * | 8/2009 | Kabatzke | F03D 7/0224 290/44 |
| 2009/0295159 A1 * | 12/2009 | Johnson | F03D 7/0224 290/44 |
| 2010/0140940 A1 | 6/2010 | Kammer et al. | |
| 2010/0270798 A1 * | 10/2010 | Poulsen | F03D 7/0224 290/44 |
| 2012/0029892 A1 * | 2/2012 | Thulke | F03D 7/045 703/7 |
| 2013/0214535 A1 | 8/2013 | Brath | |
| 2013/0261819 A1 * | 10/2013 | Chauvin | F03D 7/022 700/287 |

\* cited by examiner

WIND TURBINE CONTROL METHOD USING AN ESTIMATION OF THE INCIDENT WIND SPEED

CROSS REFERENCE TO RELATED APPLICATIONS

Reference is made to French Application Serial No. 12/02.601, filed on Oct. 1, 2012 and PCT/FR2013,052040, filed on Sep. 4, 2013, which applications are incorporated herein by reference in their entirety.

BACKGROUND OF THE INVENTION

Field of the Invention

The present invention relates to renewable energy and more particularly to control of wind turbines.

Description of the Prior Art

A wind turbine converts the kinetic energy from the wind into electrical or mechanical energy. For conversion of the wind energy to electrical energy, the wind turbine is made up of the following elements:

A tower allows a rotor to be positioned at a sufficient height to enable motion thereof (necessary for horizontal-axis wind turbines) or allowing the rotor to be positioned at a height enabling it to be driven by a stronger and more regular wind than at ground level. The tower generally houses part of the electrical and electronic components (modulator, control, multiplier, generator, etc.).

A nacelle is mounted at the top of the tower, housing mechanical, pneumatic and some electrical and electronic components necessary to operate the machine. The nacelle can rotate to adjust the machine to the correct wind direction.

A rotor is fastened to the nacelle, comprising blades (generally three) and the nose of the wind turbine. The rotor is driven by wind energy and it is connected by a mechanical shaft, directly or indirectly (via a gearbox and mechanical shaft system), to an electrical machine (electrical generator) that converts the energy recovered to electrical energy.

A transmission having two shafts (mechanical shaft of the rotor and mechanical shaft of the electrical machine) is connected by a transmission (gearbox).

Since the beginning of the 1990s, there has been renewed interest in wind power, in particular in the European Union where the annual growth rate is about 20%. This growth is attributed to the benefit of carbon-emission-free electricity generation. In order to sustain this growth, the energy yield of wind turbines still has to be improved. The prospect of wind power production increase requires developing effective production tools and advanced control tools in order to improve the performance of the machines. Wind turbines are designed to produce electricity at the lowest possible cost. They are therefore generally built to reach their maximum performance at a wind speed of approximately 15 m/s. It is in fact unnecessary to design wind turbines that maximize their yield at higher wind speeds, which are not common. In the case of wind speeds above 15 m/s, it is necessary to not capture part of the additional energy contained in the wind to avoid damage to the wind turbine. All wind turbines are therefore designed with a power regulation system.

For this power regulation, controllers have been designed for variable-speed wind turbines. The purpose of the controllers is to maximize the electrical power which is recovered, to minimize the rotor speed fluctuations and to minimize the fatigue and the extreme moments of the structure (blades, tower and platform).

Linear controllers have been widely used for power control which control the blade pitch angle (orientation of the blades). These include techniques using PI (proportional integral) and PID (proportional integral derivative) controllers, LQ (linear quadratic) control techniques and strategies based on robust linear controls.

However, the performance of these linear controllers is limited by the highly non-linear characteristics of the wind turbine. First a strategy based on non-linear controls was developed. Such a strategy is for example described in the document: Boukhezzar B., Lupu L., Siguerdidjane H., Hand M. "*Multivariable Control Strategy for Variable Speed, Variable Pitch Wind Turbines*" Renewable Energy, 32 (2007) 1273-1287.

None of these strategies however uses the incident wind speed which is a fundamental element for the aerodynamic phenomena that govern the wind turbine. To take this component into account, initial work was performed with a measurement of the wind speed. This work shows that the productivity of a wind turbine and the life thereof can be significantly increased through innovative strategies using the wind speed.

This technique unfortunately requires a sensor that is expensive and is not very accurate. To take the incident wind speed into account without a sensor, an estimation of this speed can be performed to use this data in the control. Further work has been conducted to this end using a Kalman filter, which is described in the document: Boukhezzar B., Siguerdidjane H., "*Nonlinear Control of Variable Speed Wind Turbine Without Wind Speed Measurement*" IEEE Control and Decision Conference (2005). This method is not sufficiently accurate because the wind reconstruction is poorly representative. Indeed, according to this method, the wind is not structured and is considered as white noise, which is not the case experimentally.

SUMMARY OF THE INVENTION

The invention relates to a method for controlling a wind turbine in order to optimize the energy produced with control accounting for an estimation of the incident wind speed. Estimation of the wind speed is achieved by accounting for the dynamics of the system, from the measurement of the rotor speed, the torque imposed on the generator and of the orientation of the turbine blades for an accurate estimation.

The invention relates to a method for controlling a wind turbine including a rotor to which at least one blade is attached, and an electrical machine connected to the rotor, wherein a pitch angle $\theta$ of the at least one blade and an electrical recovery torque $T_e$ of the electrical machine are measured or determined. The method comprises carrying out the following stages:

a) constructing a dynamic model of the rotor by applying the fundamental principle of dynamics to the rotor wherein the model relates the incident wind speed at the wind turbine $V_w$ to a rotating speed of the rotor $\Omega_r$, to the pitch angle $\theta$ of the blade and to the electrical recovery torque $T_e$;

b) measuring the rotating speed of the rotor $\Omega_r$;

c) determining the incident wind speed $V_w$ from use of the rotor dynamics model, of the measured rotating speed of the rotor $\Omega_r$, of the pitch angle $\theta$ of the blade and of the electrical torque $T_e$; and d) controlling the pitch angle $\theta$ of the blade and/or the electrical recovery torque $T_e$ as a function of the incident wind speed $V_w$ to optimize the production of energy by the wind turbine.

According to the invention, the rotor dynamics model is expressed by the relationship:

$$J_r \frac{d\Omega_r}{dt} = T_{aero} - T_l(\Omega_r) - NT_e,$$

with $J_r$ being the inertia of the rotor, $T_{aéro}$ being the aerodynamic torque applied to the rotor that depends on the incident wind speed $V_w$, the rotating speed of the rotor $\Omega_r$ and the pitch angle $\theta$, $T_l(\Omega_r)$ being friction and load torque on the rotor that depends on the rotating speed of the rotor $\Omega_r$, and N being the transmission ratio between the rotor and the electrical machine.

Advantageously, the aerodynamic torque applied to the rotor is expressed by a formula:

$$T_{aero} = 0.5\rho\Pi R_b^3 c_q\left(\theta, \frac{R_b \Omega_r}{V_w}\right) V_w^2,$$

with $R_b$ being the radius of the rotor, $\rho$ being the air density, and $c_q$ being a parameter determined by mapping the rotor as a function of the pitch angle $\theta$ and of ratio $$\frac{R_b \Omega_r}{V_w}.$$

According to an embodiment of the invention, when the incident wind speed $V_w$ is considered as a harmonic perturbation, the incident wind speed $V_w$ can be written with a formula:

$$V_w(t) = \sum_{k=-p}^{p} c_k e^{(i\omega_k t)}$$

with p being the number of harmonics which are considered, $\omega_k$ being the frequency of harmonic k, $c_k$ being the coefficient of harmonic k, and the incident wind speed $V_w$ is determined by determining parameters $\omega_k$ and $c_k$ by use of a rotor dynamics model, and then the incident wind speed is deduced therefrom.

Preferably, the frequency of a harmonic k is determined using a formula of the type:

$$\omega_k = 3\frac{k}{p}.$$

Advantageously, coefficients $c_k$ are determined by solving a system of equations of the form:

with $L_\Omega$ being a gain that controls the convergence rate of the estimation of the rotor rotating speed, $L_k$ being a gain that controls the convergence rate of the harmonic decomposition, and $\Omega$ representing the measured rotor speed.

Preferably, the gain $L_\Omega$ is substantially 1 and the gain $L_k$ is determined with a formula:

$$L_k = \frac{10}{1+\omega_k^2}.$$

Furthermore, the pitch angle $\theta$ can be controlled by use of the following stages:
  i) determining an aerodynamic torque setpoint $T_{aero}^{sp}$ and an electrical machine torque setpoint $T_e^{sp}$ which allows maximizing the power recovery, from the incident wind speed $V_w$, measurements of the rotor rotating speed $\Omega_r$ and the rotating speed of the electrical machine shaft $\Omega_e$;
  ii) modifying at least one of the setpoint values by subtracting a term proportional to a difference between measured rotor speed $\Omega_r$ and measured electrical machine speed $\Omega_e$;
  iii) determining a pitch angle $\theta^{sp}$ for the blade permitting achieving the aerodynamic torque setpoint $T_{aero}^{sp}$; and
  iv) orienting the blade according to the pitch angle $\theta^{sp}$.

Preferably, at least one of the setpoint values is modified by carrying out the following stages:
  (1) determining a torque $T_{res}$ on the transmission resulting from the aerodynamic torque $T_{aero}^{sp}$ and electrical machine torque $T_e^{sp}$ setpoints;
  (2) determining a resulting torque setpoint $T_{res}^{sp}$ by subtracting from the resulting torque $T_{res}$ a term proportional to the difference between measured rotor speed $\Omega_r$ and measured electrical machine speed $\Omega_e$; and
  (3) modifying the aerodynamic torque setpoint $T_{aero}^{sp}$ by distributing the resulting torque setpoint $T_{res}^{sp}$ between an aerodynamic torque $T_{aero}^{sp}$ and the electrical machine torque $T_e^{sp}$.

According to an embodiment of the invention, the resulting torque setpoint $T_{res}^{sp}$ is written as follows: $T_{res}^{sp} = T_{res} - k\dot{\gamma}_{tr}$ with k being strictly positive calibration parameters and $\dot{\gamma}_{tr}$ being the speed of a gear transmission torsion, equal to a difference of rotor speed $\Omega_r$ and electrical machine speed $\Omega_e$ inputted to the same axis:

$$\dot{\gamma}_{tr} = \Omega_r - \frac{1}{N}\Omega_e,$$

where N is a gear ratio between the rotor and the electrical machine.

Furthermore, the pitch angle of the blade can be determined by inverting an aerodynamic torque model and using the incident wind speed $V_w$ and measured rotor speed $\Omega_r$.

Advantageously, the proportional term is determined using transmission dynamics model.

$$\begin{cases} J_r \dfrac{d\Omega_r}{dt} = 0.5\rho\Pi R_b^3 c_q\left(\theta, \dfrac{R_b \Omega_r}{\sum_{k=-p}^{p} c_k e^{(i\omega_k t)}}\right)\left(\sum_{k=-p}^{p} c_k e^{(i\omega_k t)}\right)^2 - T_l(\Omega_r) - NT_e - J_r L_\Omega(\Omega_r - \Omega) \\ \dfrac{dc_k}{dt} = -L_k e^{(-i\omega_k t)}(\Omega_r - \Omega) \text{ for any } k \in [-p, p] \end{cases}$$

BRIEF DESCRIPTION OF THE DRAWINGS

Other features and advantages of the method according to the invention will be clear from reading the description hereafter of embodiments given by way of non limitative example, with reference to the accompanying figures wherein.

and

Figure 4:
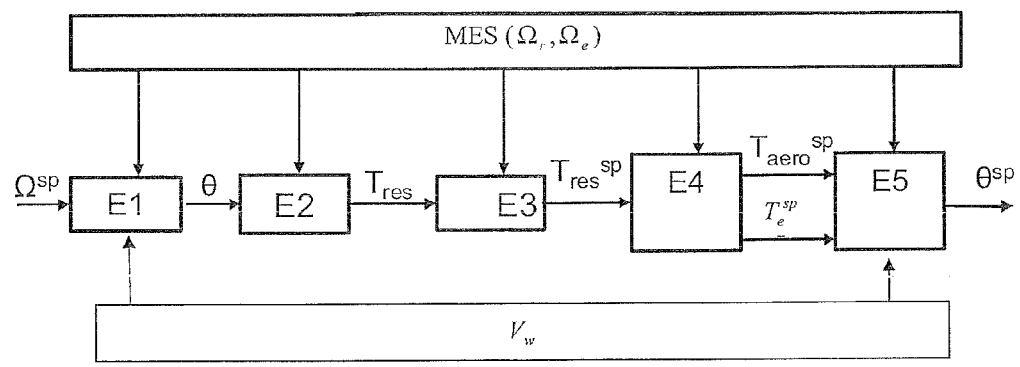

FIG. 4 illustrates the wind turbine control stages according to an embodiment of the invention.

DETAILED DESCRIPTION OF THE INVENTION

The invention relates to a method for controlling an onshore or offshore horizontal-axis wind turbine, wherein the pitch angle of the blades and/or the electrical recovery torque of the electrical machine are controlled to optimize energy recovery.

Notations

In the description hereafter, the following notations are used:

- $\theta$ is the pitch angle of the blades which is the angle between the blades and a reference such as the ground (horizontal plane, perpendicular to the tower of the wind turbine) and the pitch angle which can be controlled by the method according to the invention;
- $T_e$ is the electrical recovery torque of the electrical machine, which can be controlled by the method according to the invention;
- $V_w$ is the incident wind speed at the blades of the wind turbine which is estimated by the method according to the invention;
- $\Omega_r$ is the rotating speed of the wind turbine rotor which can be measured;
- $\Omega_e$ is the rotating speed of the electrical machine shaft which can be measured;
- $J_r$ is the inertia of the wind turbine rotor which is a known value;
- $J_g$ is the inertia of the electrical machine;
- $T_{aero}$ is the aerodynamic torque applied to the rotor which is the rotational force applied to the rotor under the effect of wind;
- $T_l$ is the friction and load torque on the rotor which can be determined by a second-order polynomial of the rotor rotating speed $\Omega_r$;
- N is the gear ratio between the rotor and the electrical machine;
- $R_b$ is the rotor radius;
- $\rho$ is the air density. The air density varies as a function of temperature and atmospheric pressure. It is generally around 1.2 kg/m³;
- $c_q$ is the coefficient given by a map of the rotor as a function of pitch angle $\theta$ and ratio $$\frac{R_b \Omega_r}{V_w}$$

Figure 3:
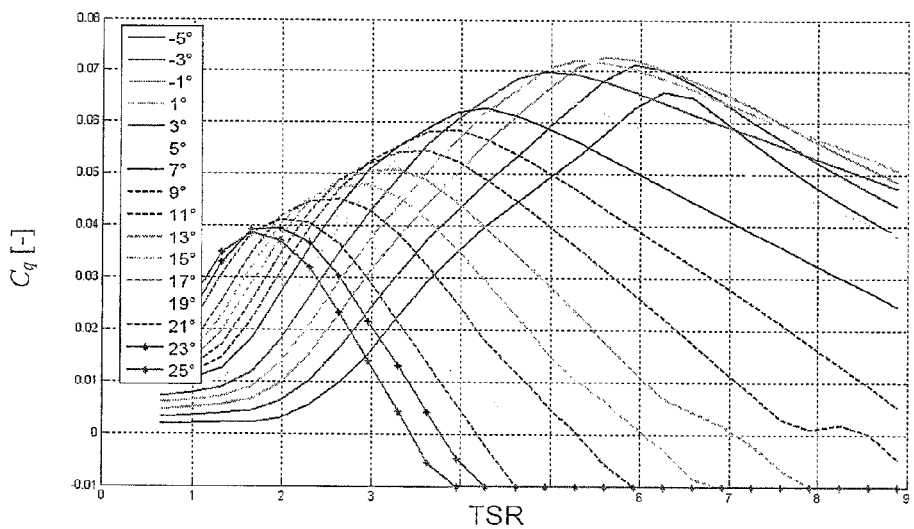
FIG. 3 shows a map of the rotor giving coefficient $c_q$, as a function of pitch angle $\theta$ and of ratio $$\frac{R_b \Omega_r}{V_w};$$

FIG. 3 is an example of a map used for determining the coefficient;

- $c_k$ is the coefficient of harmonic k of the harmonic decomposition of incident wind speed $V_w$;
- $\omega_k$ is the frequency of harmonic k of the harmonic decomposition of incident wind speed $V_w$;
- p is the number of harmonics being considered for the harmonic decomposition of incident wind speed $V_w$;
- $L_\Omega$ is the gain controlling the convergence rate of the rotor speed estimation;
- $L_k$ is the gain controlling the convergence rate of the harmonic decomposition of incident wind speed $V_w$;
- $T_{res}$ is the resulting torque on the transmission between the rotor and the electrical machine;
- $\dot{\gamma}_{tr}$ is the torsion speed of the transmission between the rotor and the electrical machine.

These notations, when followed by superscript—$^{sp}$, represent the setpoints associated with the quantities being considered.

Figure 1:
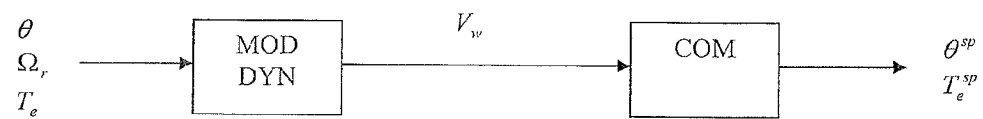
FIG. 1 illustrates the stages of the method according to the invention.

FIG. 1 shows the method according to the invention. The stages of the method according to the invention are as follows:

1) Measurement of rotor rotating speed $\Omega_r$
2) Construction of a rotor dynamics model (MOD DYN)
3) Wind turbine control (COM)

Stage 1)—Measurement of the Rotor Rotating Speed

Rotor rotating speed $\Omega_r$ is measured during operation of the wind turbine, notably by a rotation sensor.

Stage 2)—Construction of a Rotor Dynamics Model (MOD DYN)

The actual pitch angle $\theta$ of the blades is first determined, as well as electrical recovery torque $T_e$, by measuring (with a sensor for example) or as a function of the control applied to the actuators to modify these parameters.

A rotor dynamics model is then constructed. A rotor dynamics model is understood to be a model representing the dynamic phenomena applied to the rotor. This model is obtained by applying the fundamental principle of dynamics to the rotor. The model allows relating the incident wind speed $V_w$ to a rotating speed of the rotor $\Omega_r$, to pitch angle $\theta$ of the blade and to electrical recovery torque $T_e$ of the electrical machine.

This rotor dynamics model is then applied with known data: $\theta$ and $T_e$, and at the measured value $\Omega_r$, which thus allows to determine incident wind speed $V_w$.

Figure 2:
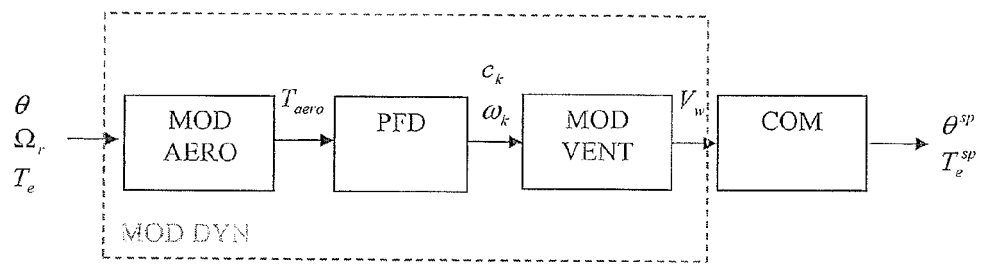
FIG. 2 illustrates the stages of the method according to an embodiment of the invention.

FIG. 2 shows an embodiment of the method according to the invention. For this embodiment, the rotor dynamics model (MOD DYN) is constructed by use of a model of the aerodynamic torque (MOD AERO), of the fundamental dynamics principle (PFD) applied to the rotor and of a wind model (MOD VENT).

Aerodynamic Torque Model (MOD AERO)

According to this embodiment of the invention, aerodynamic torque $T_{aero}$ is modelled by a model describing the wind power contained in a cylinder, multiplied by a factor describing the fact that a wind turbine only allows recovery of part of this power. Aerodynamic torque $T_{aero}$ is thus modelled as a function of incident wind speed $V_w$, pitch angle $\theta$ and rotor speed $\Omega_r$. Such a model can be expressed under steady state conditions as $$T_{aero} = 0.5\rho \Pi R_b^3 c_q\left(\theta, \frac{R_b\Omega_r}{V_w}\right)V_w^2.$$

The parameter $c_q$ can be determined by mapping the rotor. An example of mapping parameter $c_q$ is shown in FIG. 3. This map shows the value of parameter $c_q$ as a function of ratio $$\frac{R_b\Omega_r}{V_w}$$

for various pitch angles (a curve for each $\theta$). This type of map is well known. Ratio $$\frac{R_b\Omega_r}{V_w}$$

is denoted by TSR in FIG. 3.

Aerodynamic torque $T_{aero}$ can therefore be written as a function of quantities related to the wind turbine ($\rho, R_b$), of the known value ($\theta$) and of the incident wind speed to be estimated ($V_w$).

Fundamental Dynamics Principle (PFD)

By writing the fundamental dynamics principle applied to the rotor concerning the moments on the axis of rotation thereof, a relation is obtained of the type:

$$J_r\frac{d\Omega_r}{dt} = T_{aero} - T_l(\Omega_r) - NT_e.$$

In this relation, the aerodynamic torque $T_{aero}$ determined with the aerodynamic torque model described above is used. Furthermore, the friction and load torque on the rotor $T_l$ can be conventionally determined by a second-order polynomial of rotating speed $\Omega_r$ of the rotor.

By combining the two models, a relation between incident wind speed $V_w$ and the known or measured quantities such as pitch angle $\theta$ of the blades, electrical recovery torque $T_e$ and rotating speed $\Omega_r$ of the rotor can be established.

Incident Wind Modelling (MOD VENT)

The last modelling stage considers the wind as a harmonic perturbation. This means an assumption that the wind can be is written in the form:

$$V_w(t) = \sum_{k=-p}^{p} c_k e^{(i\omega_k t)}$$

with p being the number of harmonics being considered for the harmonic decomposition of the wind. For example, p=50 can be selected.

Moreover, for the frequency of the harmonics, $$\omega_k = 3\frac{k}{p}$$

in Hz (with k>0) can be chosen.

By combining the three models presented above, a dynamic model of the form as follows can be obtained:

$$\begin{cases} J_r\dfrac{d\Omega_r}{dt} = 0.5\rho\Pi R_b^3 c_q\left(\theta, \dfrac{R_b\Omega_r}{\sum_{k=-p}^{p} c_k e^{(i\omega_k t)}}\right)\left(\sum_{k=-p}^{p} c_k e^{(i\omega_k t)}\right)^2 - T_l(\Omega_r) - NT_e \\ \dfrac{dc_k}{dt} = 0 \qquad \text{for any } k \in [-p, p] \end{cases}$$

From this system of equations, an observer can be constructed allowing determination of coefficients $c_k$ of the harmonic decomposition of the incident wind. The observer can be written in the form:

$$\begin{cases} J_r\dfrac{d\Omega_r}{dt} = 0.5\rho\Pi R_b^3 c_q\left(\theta, \dfrac{R_b\Omega_r}{\sum_{k=-p}^{p} c_k e^{(i\omega_k t)}}\right)\left(\sum_{k=-p}^{p} c_k e^{(i\omega_k t)}\right)^2 - T_l(\Omega_r) - NT_e - J_r L_\Omega(\Omega_r - \Omega) \\ \dfrac{dc_k}{dt} = -L_k e^{(-i\omega_k t)}(\Omega_r - \Omega) \qquad \text{for any } k \in [-p, p] \end{cases}$$

where $\Omega$ represents the measured rotor speed, $L_\Omega$ is necessarily a positive gain controlling the convergence rate of the rotor speed estimation. The gain for example can be selected equal to 1, and $\{L_k\}_{k\in[-p,p]}$ is a gain controlling the convergence rate of the harmonic decomposition. These gains must be positive, and for example can be selected equal to $$\frac{10}{1+\omega_k^2}$$

The latter system of equations represents an adaptive type non-linear estimator allowing estimation of coefficients $c_k$ of the harmonic decomposition of the incident wind signal $V_w$.

This method reconstructs the excitation of wind $V_w$ through coefficients $c_k$. Reconstructed wind $V_w$ is given by the relation as follows:

$$V_w(t) = \sum_{k=-p}^{p} c_k e^{(i\omega_k t)}.$$

Stage 3)—Wind Turbine Control (COM)

Depending on incident wind speed $V_w$, the wind turbine is controlled to optimize the recovered energy. According to the invention, pitch angle θ of the blades and/or electrical recovery torque $T_e$ can be controlled as a function of incident wind $V_w$.

According to an embodiment of the invention, pitch angle θ of the blades and/or electrical recovery torque $T_e$ are determined by mapping the wind turbine as a function of incident wind $V_w$.

Alternatively, according to an embodiment of the invention illustrated in FIG. 4, pitch angle θ of the blades can be controlled by the following stages:

1—Determining the pitch allowing the recovered power to be optimized
   i—Generating an electrical torque setpoint $T_e^{sp}$
   ii—Generating an aerodynamic torque setpoint $T_{aero}^{sp}$
   iii—Determining a pitch position θ
2—Determining the torque resulting from the torque setpoints $T_e^{sp}$ and $T_{aero}^{sp}$
3—Generating a resulting torque setpoint ($T_{res}^{sp}$) that decreases fatigue and extreme moments of the transmission
4—Distributing the resulting torque setpoint ($T_{res}^{sp}$) between the aerodynamic and electrical torques
5—Determining a pitch position allowing the aerodynamic torque to be achieved
6—Orienting the blades at the determined pitch angle.

1—Determining the Pitch Allowing the Recovered Power to be Optimized

One goal of the method according to the invention is to maximize the energy production of an onshore or offshore horizontal-axis wind turbine (blade perpendicular to the wind) while limiting extreme moments and fatigue of the mechanical structure.

To maximize the energy production of a wind turbine, the pitch angle θ of the blades is sought which allows maximizing the recovered power $P_{aero}$ as a function of incident wind speed $V_w$ determined in the rotor dynamics model construction stage is sought.

According to an embodiment, a model of the recoverable power is used to define this angle. This power $P_{aero}$ can be written as follows:

$$P_{aero} = T_{aero} * \Omega_r.$$

Angle θ is sought allowing $P_{aero}$ to be maximized. The following stages are therefore carried out:
   i—Generating an electrical machine torque setpoint $T_e^{sp}$
   ii—Generating an aerodynamic torque setpoint $T_{aero}^{sp}$
   iii—Determining a pitch position θ
   i—Generating an Electrical Machine Torque Setpoint $T_e^{sp}$ An electrical machine torque setpoint $T_e^{sp}$ is first determined. This setpoint value is obtained through mapping as a function of the speed of the electrical machine.

According to the invention, aerodynamic torque $T_{aero}$ is modelled by the aerodynamic model as described in the dynamic model construction part.

$$T_{aero} = 0.5 \rho \Pi R_b^3 c_q\left(\theta, \frac{R_b \Omega_r}{V_w}\right) V_w^2$$

Thus, to determine the torque setpoint for the electrical machine as a function of the speed of the electrical machine, the aerodynamic power recovered for each wind speed is optimized.

$$T_e^{sp} = \arg\left(\max_{\theta, V_w} \frac{0.5}{N} \rho \Pi R_b^3 c_q\left(\theta, \frac{R_b \Omega_g}{NV_w}\right) V_w^2\right)$$

This allows having torque setpoint $T_e$ that depends on the rotating speed of the electrical machine shaft: $T_e^{sp} = f(\Omega_e)$.

However, in relation to this reference curve, two limitations are applied:
   a zero torque for low electrical machine speeds so that the wind turbine speed can be increased
   a maximum torque to limit the power of the electrical machine.

Thus, there are three regions in the curve $T_e^{sp} = f(\Omega_e)$:
Region 1: zero torque
Region 2: optimum torque
Region 3: torque limited by the maximum power.
   ii—Generating an aerodynamic torque setpoint $T_{aero}^{sp}$ The purpose is to generate an aerodynamic torque setpoint $T_{aero}^{sp}$ allowing achieving the rotor rotating speed setpoint $\Omega_r^{sp}$. The rotor dynamics model is therefore used.

$$J_r \frac{d\Omega_r}{dt} = T_{aero} - T_l(\Omega_r) - NT_e(\Omega_e)$$

Thus, the control strategy used is a dynamic control strategy that anticipates the setpoint variation and corrects with two terms which are a proportional term and an integral term. The strategy is written with a relation of the form:

$$T_{aero}^{sp} = T_l(\Omega_r) + NT_e(\Omega_r) + J_r \frac{d\Omega_r^{sp}}{dt} - k_p(\Omega_r - \Omega_r^{sp}) - k_i \int (\Omega_r - \Omega_r^{sp})$$

where kp and ki are two real parameters to be calibrated so as to guarantee convergence of the speed to the setpoint thereof.
   iii—Determining a Pitch Position θ

From this aerodynamic torque setpoint $T_{aero}^{sp}$, a pitch angle θ is determined for the blades to satisfy this aerodynamic torque request $T_{aero}^{sp}$. The aerodynamic torque model is therefore used with the incident wind speed $V_w$ determined in the rotor dynamics model construction stage, the measured rotor speed $\Omega_r^{sp}$ and the torque setpoint $T_{aero}^{sp}$. By inverting the model (using a Newton algorithm for example), a pitch setpoint $\overline{\theta}$ is obtained:

$$\overline{\theta} = \arg\left(\min_\theta \left(T_{aero}^{sp} - 0.5\rho \Pi R_b^3 c_q\left(\theta, \frac{R_b \Omega_r}{V_w}\right) V_w^2\right)^2\right)$$

Thus, with this control law, the convergence to the reference rotor speed allowing the recovered power to be maximized is guaranteed.

2—Determining the Torque Resulting from the Torque Setpoints $T_e^{sp}$ and $T_{aero}^{sp}$ From setpoints $T_e^{sp}$ and $T_{aero}^{sp}$, torque $T_{res}$ resulting from these two torques and relating to the transmission is determined. Therefore, this torque is modeled by use of the formula as follows:

$$\bar{T}_{res} = \frac{J_g}{J_r + J_g}(T_{aero}^{sp} - T_l) + \frac{J_r}{J_r + J_g}NT_e^{sp}$$

where $J_r$ and $J_g$ are the inertias of the rotor and of the electrical machine respectively.

3—Generating a Resulting Torque Setpoint ($T_{res}^{Sp}$) that Decreases the Fatigue and the Moments of the Transmission It is desired to modify this resulting torque $T_{res}$ in order to minimize the impact on the transmission and thus to increase the life thereof. Therefore, it is desirable to decrease the torsion speed variations of the transmission. Thus, an attempt is made to compensate for the torque with terms proportional to the difference between the speed of the rotor and of the electrical machine. The dynamics of the mechanical structure (transmission dynamics) can be written in form of two coupled second-order systems.

$$\begin{cases} \frac{J_r J_g}{J_r + J_g}\ddot{\gamma}_{tr} = -c_d\gamma_{tr} - k_d\dot{\gamma}_{tr} + \frac{J_g}{J_r + J_g}(T_{aero} - T_l) + \frac{J_r}{J_r + J_g}NT_e \\ J_g\dot{\Omega}_e = c_d\gamma_{tr} + k_d\dot{\gamma}_{tr} + N_{gb}T_e \end{cases}$$

where:

$\gamma_{tr}$, $\dot{\gamma}_{tr}$ and $\ddot{\gamma}_{tr}$ are the angle, the speed and the acceleration of the torsion of the shaft respectively. It should be noted that the transmission torsion speed is the difference between the speed of the rotor and the generator brought into the same axis, that is $$\dot{\gamma}_{tr} = \Omega_r - \frac{1}{N}\Omega_e$$

$k_d$ is the structural transmission damping
$c_d$ is the transmission stiffness
$N_{gb}$ is the gearbox ratio, that is the ratio of the generator speed to the rotor speed.

Thus, the control strategy is designed to generate a resulting torque different from $T_{res}$ to minimize the fatigue and the extreme moments of the transmission. Accordingly, the relationship is obtained:

$$T_{res}^{sp} = \bar{T}_{res} - k\dot{\gamma}_{tr}$$

with k being strictly positive calibration parameters. These parameters can be determined experimentally. All the parameters k can be considered equal to 1 for example.

4—Distributing the Resulting Torque Setpoint ($T_{res}^{sp}$) Between the Aerodynamic and Electrical Torques This resulting torque setpoint $T_{res}^{sp}$ is then distributed between aerodynamic torque $T_{aero}$ and torque $T_e$ of the electrical machine. Distribution is achieved according to the operating zones. In a zone 2, where the aerodynamic torque is limiting, a torque reserve exists. In this case, the torque modification influences the torque of the electrical machine and not the aerodynamic torque. Thus, in this case, the relationship:

$$\begin{cases} T_{aero}^{strat} = T_{aero}^{sp} \\ T_e^{strat} = T_e^{sp} - k\frac{J_r + J_g}{NJ_r}\dot{\gamma}_{tr} \end{cases}$$

Similarly, in a zone 3 where the torque of the electrical machine is limiting, the torque modification influences the aerodynamic torque. Therefore, the relationship is obtained:

$$\begin{cases} T_{aero}^{strat} = T_{aero}^{sp} - k\frac{J_r + J_g}{J_g}\dot{\gamma}_{tr} \\ T_e^{strat} = T_e^{sp} \end{cases}$$

5—Determining a Pitch Position Allowing the Aerodynamic Torque to be Achieved

From this aerodynamic torque setpoint $T_{aero}^{strat}$, a pitch angle $\theta$ for the blades is required to satisfy the aerodynamic torque request $T_{aero}^{strat}$. Therefore, the aerodynamic torque model with the incident wind speed $V_w$ determined in the rotor dynamics model construction stage, the measured rotor speed $\Omega_r^{sp}$ and the torque setpoint $T_{aero}^{strat}$ is used. By inverting the model (using a Newton algorithm for example), a pitch setpoint $\bar{\theta}$ is obtained:

$$\bar{\theta} = \arg\left(\min_\theta \left(T_{aero}^{strat} - 0.5\rho\Pi R_b^3 c_q\left(\theta, \frac{R_b\Omega_r}{V_w}\right)V_w^2\right)^2\right)$$

Thus, with this control law, the convergence to the reference rotor speed allowing the recovered power to be maximized, while minimizing the mechanical impact (fatigue and extreme moment) on the transmission is guaranteed.

6—Orienting the Blades at the Determined Pitch Angle

To optimize the electrical power recovered by the wind turbine, the blades are oriented at the pitch angle calculated in the previous stage.

The invention claimed is:

1. A method for controlling a wind turbine, comprising a rotor to which at least one blade is attached and an electrical machine connected to the rotor, wherein pitch angle of the at least one blade and electrical recovery torque of the electrical machine are measured or determined, comprising:

a) constructing a model of dynamics of the rotor using a principle of dynamics to describe the rotor, the model relating incident wind speed at the wind turbine to rotating speed of the rotor, the pitch angle of at least one blade and the electrical recovery torque;

b) measuring the rotating speed of the rotor;

c) determining an incident wind speed by using the model of dynamics of the rotor, of the measured rotating speed of the rotor, of the pitch angle of the at least one blade and of the electrical torque; and d) controlling the pitch angle of at least one blade and/or the electrical recovery torque as a function of the incident wind speed to optimize production of energy by the wind turbine.

2. A method as claimed in claim 1, wherein the model of dynamics of the rotor is expressed as:

$$J_r\frac{d\Omega_r}{dt} = T_{aero} - T_l(\Omega_r) - NT_e,$$

with $J_r$ being inertia of the rotor, $T_{aero}$ being aerodynamic torque applied to the rotor depending on the incident wind speed $V_w$, $\Omega_r$ being the rotating speed of the rotor and the pitch angle $\theta$, $T_l(\Omega_r)$ being the friction and load torque on the rotor depending on the rotating speed of the rotor $\Omega_r$, and N being a transmission ratio between the rotor and the electrical machine.

3. A method as claimed in claim 2, wherein the aerodynamic torque applied to the rotor is expressed by the relationship:

$$T_{aero} = 0.5\rho \Pi R_b^3 c_q\left(\theta, \frac{R_b\Omega_r}{V_w}\right)V_w^2,$$

with $R_b$ being the radius of the rotor, $\rho$ being the air density, $c_q$ being is a parameter determined by mapping the rotor as a function of the pitch angle $\theta$ and of ratio $$\frac{R_b\Omega_r}{V_w}.$$

4. A method as claimed in claim 3 wherein, the incident wind speed $V_w$ is considered to be a harmonic perturbation, and is expressed by the relationship:

$$V_w(t) = \sum_{k=-p}^{p} c_k e^{(i\omega_k t)}$$

with p being a number of harmonics, $\omega_k$ being a frequency of harmonic k, $c_k$ being a coefficient of harmonic k, and the incident wind speed $V_w$ is determined by determining parameters $\omega_k$ and $c_k$ by use of the model of rotor dynamics with the incident wind speed $V_w$ being deduced therefrom.

5. A method as claimed in claim 4, wherein the frequency of harmonic k is determined by a relationship:

$$\omega_k = 3\frac{k}{p}.$$

6. A method as claimed in claim 5, wherein the coefficient $c_k$ is determined by solving a system of equations expressed as:

$$\begin{cases} J_r\dfrac{d\Omega_r}{dt} = 0.5\rho \Pi R_b^3 c_q\left(\theta, \dfrac{R_b\Omega_r}{\sum_{k=-p}^{p} c_k e^{(i\omega_k t)}}\right)\left(\sum_{k=-p}^{p} c_k e^{(i\omega_k t)}\right)^2 - T_l(\Omega_r) - NT_e - J_rL_\Omega(\Omega_r - \Omega) \\ \dfrac{dc_k}{dt} = -L_k e^{(-i\omega_k t)}(\Omega_r - \Omega) \text{ for any } k \in [-p, p] \end{cases}$$

with $L_\Omega$ being a gain controlling a convergence rate of an estimation of the rotor rotating speed, $L_k$ being a gain that controls a convergence rate of harmonic decomposition, and $\Omega$ representing a measured rotor speed.

7. A method as claimed in claim 6, wherein the gain $L_\Omega$ is substantially 1 and the gain $L_k$ is determined by a relationship:

$$L_k = \frac{10}{1+\omega_k^2}.$$

8. A method as claimed in claim 4, wherein the coefficient $c_k$ is determined by solving a system of equations expressed as:

$$\begin{cases} J_r\dfrac{d\Omega_r}{dt} = 0.5\rho \Pi R_b^3 c_q\left(\theta, \dfrac{R_b\Omega_r}{\sum_{k=-p}^{p} c_k e^{(i\omega_k t)}}\right)\left(\sum_{k=-p}^{p} c_k e^{(i\omega_k t)}\right)^2 - T_l(\Omega_r) - NT_e - J_rL_\Omega(\Omega_r - \Omega) \\ \dfrac{dc_k}{dt} = -L_k e^{(-i\omega_k t)}(\Omega_r - \Omega) \text{ for any } k \in [-p, p] \end{cases}$$

with $L_\Omega$ being a gain controlling a convergence rate of an estimation of the rotor rotating speed, $L_k$ being a gain that controls a convergence rate of harmonic decomposition, and $\Omega$ representing a measured rotor speed.

9. A method as claimed in claim 8, wherein the gain $L_\Omega$ is substantially 1 and the gain $L_k$ is determined by a relationship:

$$L_k = \frac{10}{1+\omega_k^2}.$$

10. A method as claimed in claim 2 wherein, the incident wind speed $V_w$ is considered to be a harmonic perturbation, and is expressed by the relationship:

$$V_w(t) = \sum_{k=-p}^{p} c_k e^{(i\omega_k t)}$$

with p being a number of harmonics, $\omega_k$ being a frequency of harmonic k, $c_k$ being a coefficient of harmonic k, and the incident wind speed $V_w$ is determined by determining parameters $\omega_k$ and $c_k$ by use of the model of rotor dynamics with the incident wind speed $V_w$ being deduced therefrom.

11. A method as claimed in claim 10, wherein the frequency of harmonic k is determined by a relationship:

$$\omega_k = 3\frac{k}{p}.$$

12. A method as claimed in claim 11, wherein the coefficient $c_k$ is determined by solving a system of equations expressed as:

$$\begin{cases} J_r \frac{d\Omega_r}{dt} = 0.5\rho \Pi R_b^3 c_q\left(\theta, \frac{R_b \Omega_r}{\sum_{k=-p}^{p} c_k e^{(i\omega_k t)}}\right)\left(\sum_{k=-p}^{p} c_k e^{(i\omega_k t)}\right)^2 - T_l(\Omega_r) - NT_e - J_r L_\Omega(\Omega_r - \Omega) \\ \frac{dc_k}{dt} = -L_k e^{(-i\omega_k t)}(\Omega_r - \Omega) \text{ for any } k \in [-p, p] \end{cases}$$

with $L_\Omega$ being a gain controlling a convergence rate of an estimation of the rotor rotating speed, $L_k$ being a gain that controls a convergence rate of harmonic decomposition, and $\Omega$ representing a measured rotor speed.

13. A method as claimed in claim 12, wherein the gain $L_\Omega$ is substantially 1 and the gain $L_k$ is determined by a relationship:

$$L_k = \frac{10}{1+\omega_k^2}.$$

14. A method as claimed in claim 10, wherein the coefficient $c_k$ is determined by solving a system of equations expressed as:

$$\begin{cases} J_r \frac{d\Omega_r}{dt} = 0.5\rho \Pi R_b^3 c_q\left(\theta, \frac{R_b \Omega_r}{\sum_{k=-p}^{p} c_k e^{(i\omega_k t)}}\right)\left(\sum_{k=-p}^{p} c_k e^{(i\omega_k t)}\right)^2 - T_l(\Omega_r) - NT_e - J_r L_\Omega(\Omega_r - \Omega) \\ \frac{dc_k}{dt} = -L_k e^{(-i\omega_k t)}(\Omega_r - \Omega) \text{ for any } k \in [-p, p] \end{cases}$$

with $L_\Omega$ being a gain controlling a convergence rate of an estimation of the rotor rotating speed, $L_k$ being a gain that controls a convergence rate of harmonic decomposition, and $\Omega$ representing a measured rotor speed.

15. A method as claimed in claim 14, wherein the gain $L_\Omega$ is substantially 1 and the gain $L_k$ is determined by a relationship:

$$L_k = \frac{10}{1+\omega_k^2}.$$

16. A method as claimed in claim 1 wherein, the incident wind speed $V_w$ is considered to be a harmonic perturbation, and is expressed by the relationship:

$$V_w(t) = \sum_{k=-p}^{p} c_k e^{(i\omega_k t)}$$

with p being a number of harmonics, $\omega_k$ being a frequency of harmonic k, $c_k$ being a coefficient of harmonic k, and the incident wind speed $V_w$ is determined by determining parameters $\omega_k$ and $c_k$ by use of the model of rotor dynamics with the incident wind speed $V_w$ being deduced therefrom.

17. A method as claimed in claim 16, wherein the frequency of harmonic k is determined by a relationship:

$$\omega_k = 3\frac{k}{p}.$$

18. A method as claimed in claim 17, wherein the coefficient $c_k$ is determined by solving a system of equations expressed as:

$$\begin{cases} J_r \dfrac{d\Omega_r}{dt} = 0.5\rho \Pi R_b^3 c_q\left(\theta, \dfrac{R_b \Omega_r}{\sum_{k=-p}^{p} c_k e^{(i\omega_k t)}}\right)\left(\sum_{k=-p}^{p} c_k e^{(i\omega_k t)}\right)^2 - T_l(\Omega_r) - NT_e - J_r L_\Omega(\Omega_r - \Omega) \\ \dfrac{dc_k}{dt} = -L_k e^{(-i\omega_k t)}(\Omega_r - \Omega) \text{ for any } k \in [-p, p] \end{cases}$$

with $L_\Omega$ being a gain controlling a convergence rate of an estimation of the rotor rotating speed, $L_k$ being a gain that controls a convergence rate of harmonic decomposition, and $\Omega$ representing a measured rotor speed.

19. A method as claimed in claim 18, wherein the gain $L_\Omega$ is substantially 1 and the gain $L_k$ is determined by a relationship:

$$L_k = \dfrac{10}{1 + \omega_k^2}.$$

20. A method as claimed in claim 16, wherein the coefficient $c_k$ is determined by solving a system of equations expressed as:

$$\begin{cases} J_r \dfrac{d\Omega_r}{dt} = 0.5\rho \Pi R_b^3 c_q\left(\theta, \dfrac{R_b \Omega_r}{\sum_{k=-p}^{p} c_k e^{(i\omega_k t)}}\right)\left(\sum_{k=-p}^{p} c_k e^{(i\omega_k t)}\right)^2 - T_l(\Omega_r) - NT_e - J_r L_\Omega(\Omega_r - \Omega) \\ \dfrac{dc_k}{dt} = -L_k e^{(-i\omega_k t)}(\Omega_r - \Omega) \text{ for any } k \in [-p, p] \end{cases}$$

with $L_\Omega$ being a gain controlling a convergence rate of an estimation of the rotor rotating speed, $L_k$ being a gain that controls a convergence rate of harmonic decomposition, and $\Omega$ representing a measured rotor speed.

21. A method as claimed in claim 20, wherein the gain $L_\Omega$ is substantially 1 and the gain $L_k$ is determined by a relationship:

$$L_k = \dfrac{10}{1 + \omega_k^2}.$$

22. A method as claimed in claim 1, wherein the pitch angle $\theta$ is controlled by a process comprising:
  i) determining an aerodynamic torque setpoint and an electrical machine torque setpoint allowing maximizing production of energy, from the incident wind speed, measurements of the rotor rotating speed and the rotating speed of the electrical machine shaft;
  ii) modifying at least one of the torque setpoint by subtracting a term proportional to a difference between measured rotor speed and measured electrical machine speed;
  iii) determining a pitch angle for the at least one blade allowing achieving the aerodynamic torque setpoint; and
  iv) orienting the blade according to the pitch angle.

23. A method as claimed in claim 22, wherein at least one of the setpoint values is modified by steps comprising:
  (1) determining a torque on the transmission resulting from the aerodynamic torque and electrical machine torque setpoints;
  (2) determining a resulting torque setpoint by subtracting from the resulting torque a term proportional to a difference between measured rotor speed and measured electrical machine speed; and
  (3) modifying the aerodynamic torque setpoint by distributing the resulting torque setpoint between an aerodynamic torque and an electrical machine torque.

24. A method as claimed in claim 23, wherein the resulting torque setpoint is expressed as: $T_{res}^{sp} = \overline{T_{res}} - k\dot{\gamma}_{tr}$ with k being strictly positive calibration parameters and $\dot{\gamma}_{tr}$ being a speed of a gear transmission torsion, equal to a difference of rotor speed $\Omega_r$ and electrical machine speed $\Omega_e$ brought into a same axis:

$$\dot{\gamma}_{tr} = \Omega_r - \dfrac{1}{N}\Omega_e,$$

where N is a gear ratio between the rotor and the electrical machine.

25. A method as claimed in claim 22, wherein the pitch angle of the at least one blade is determined by inverting an aerodynamic torque model and using the incident wind speed and measured rotor speed.

26. A method as claimed in claim 22, wherein a proportional term is determined using a model of transmission dynamics.

* * * * *